US009039055B1

(12) United States Patent
Robins

(10) Patent No.: US 9,039,055 B1
(45) Date of Patent: May 26, 2015

(54) CLEVIS TYPE HOOK WITH SAFETY LATCH

(71) Applicant: Terry K. Robins, Minneapolis, KS (US)

(72) Inventor: Terry K. Robins, Minneapolis, KS (US)

( * ) Notice: Subject to any disclaimer, the term of this patent is extended or adjusted under 35 U.S.C. 154(b) by 0 days.

(21) Appl. No.: 14/542,176

(22) Filed: Nov. 14, 2014

Related U.S. Application Data

(60) Provisional application No. 61/963,125, filed on Nov. 25, 2013.

(51) Int. Cl.
*B66C 1/34* (2006.01)
*B66C 1/36* (2006.01)
*F16B 45/02* (2006.01)

(52) U.S. Cl.
CPC .. *B66C 1/36* (2013.01); *F16B 45/02* (2013.01)

(58) Field of Classification Search
CPC .............. B66C 1/34; B66C 1/22; B66C 1/36; F16B 45/02; A44C 5/2057; A44C 5/2042
See application file for complete search history.

(56) References Cited

U.S. PATENT DOCUMENTS

| | | |
|---|---|---|
| 3,501,817 A | 3/1970 | Bambenek et al. |
| 3,795,951 A | 3/1974 | Ratcliff |
| 4,193,627 A | 3/1980 | Cranston et al. |
| 4,689,859 A | 9/1987 | Hauser |
| 5,292,165 A | 3/1994 | Wiklund |
| 5,517,735 A | 5/1996 | Tsai |
| 5,577,787 A | 11/1996 | Klope |
| 5,609,378 A | 3/1997 | Bowers et al. |
| 5,664,304 A | 9/1997 | Tambornino |
| 5,889,512 A | 3/1999 | Moller et al. |
| 6,019,408 A | 2/2000 | Bennett, Jr. |
| D503,328 S | 3/2005 | Catlett |
| 7,967,353 B2 | 6/2011 | Robins |
| 2007/0126251 A1 | 6/2007 | Olson et al. |

OTHER PUBLICATIONS

Industrial Rope Supply Company, Inc. of Cincinnati, Ohio, www.industrialrope.com/chainhks, Aug. 22, 2008, pp. 1-2.

*Primary Examiner* — Stephen Vu
(74) *Attorney, Agent, or Firm* — Banner & Witcoff, Ltd.

(57) ABSTRACT

A clevis type slip hook or grab hook includes a safety latch which is held in position by a biased pin that may be axially extended to move the latch between a latching and unlatching position to close or open the slot in the slip hook. The latch is comprised of a closure member in the form of a plate having an elongate edge that fits in the hook slot between the tip end and shank end of the hook.

7 Claims, 3 Drawing Sheets

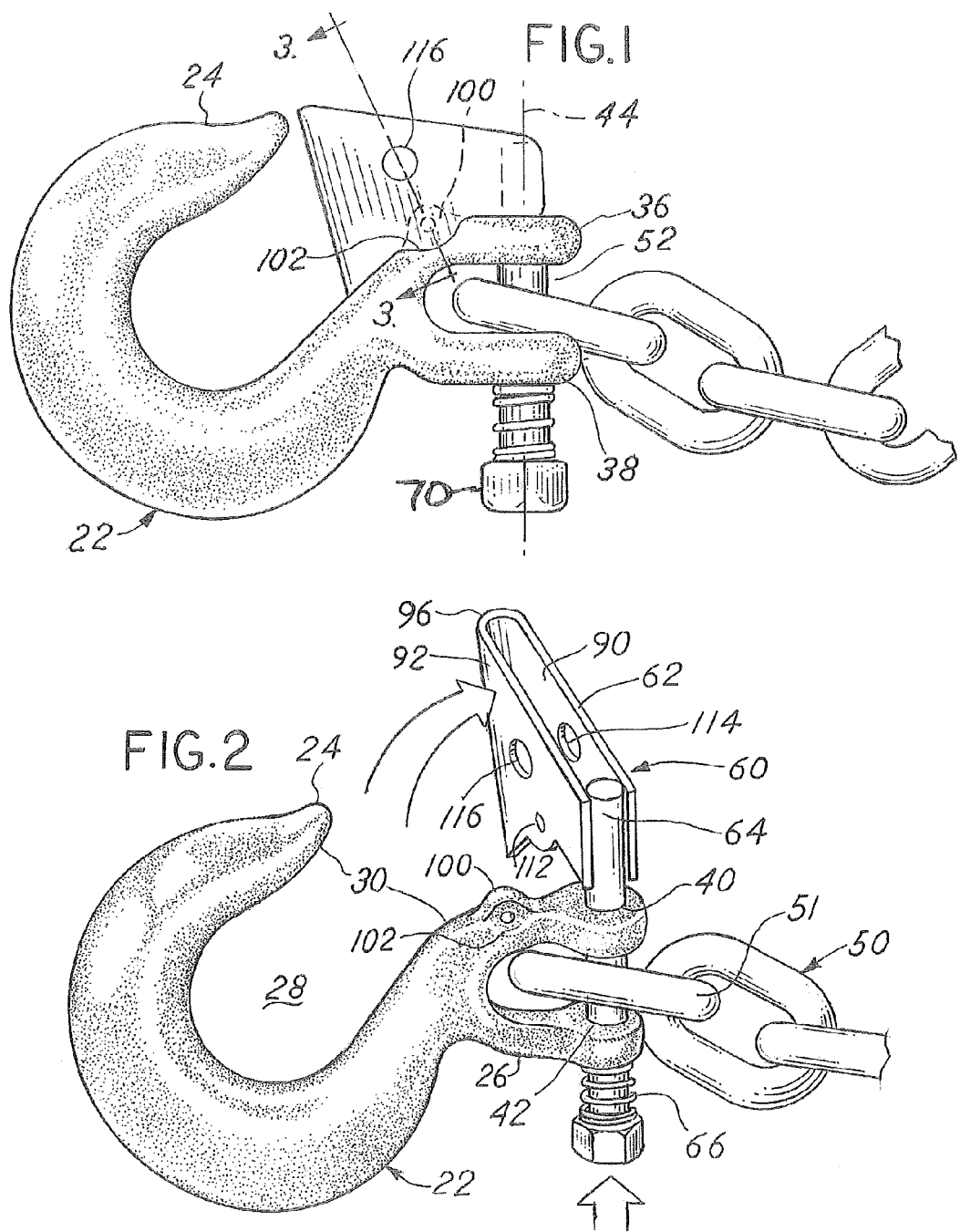

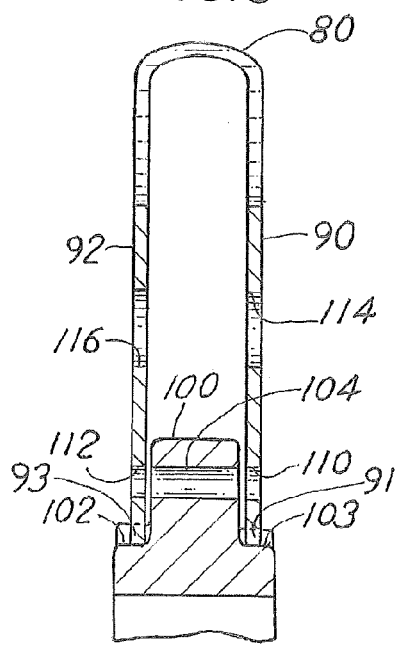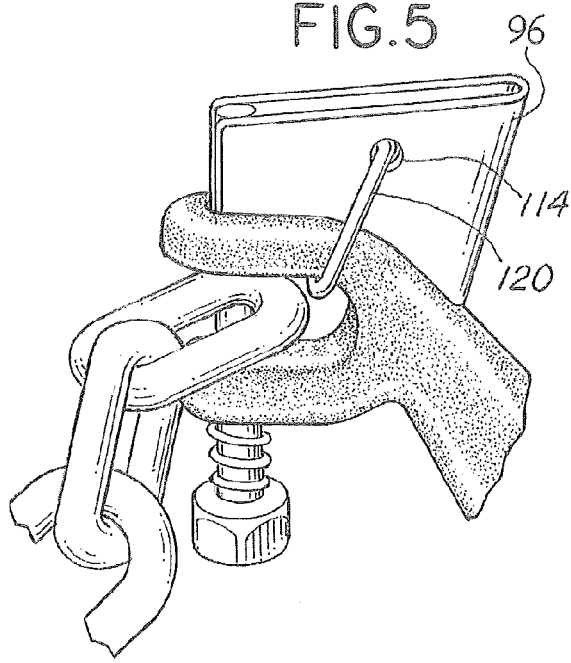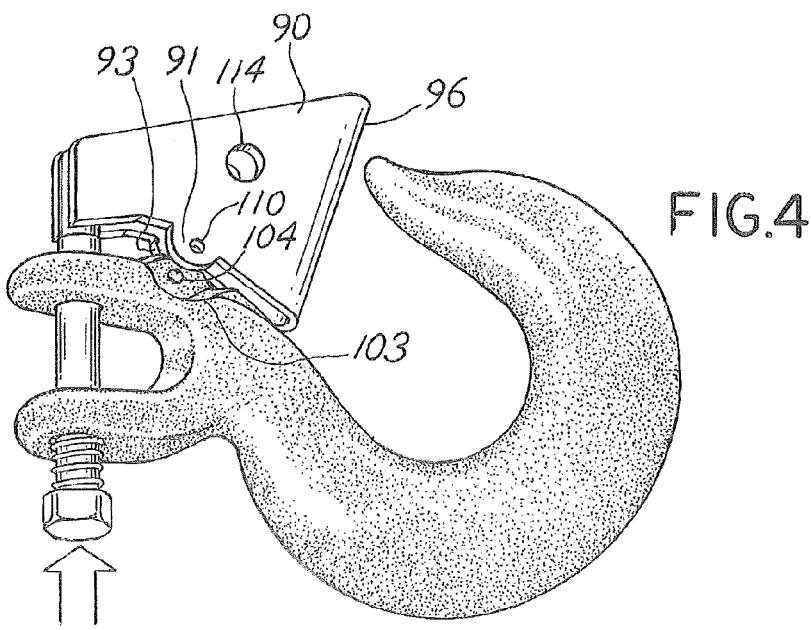

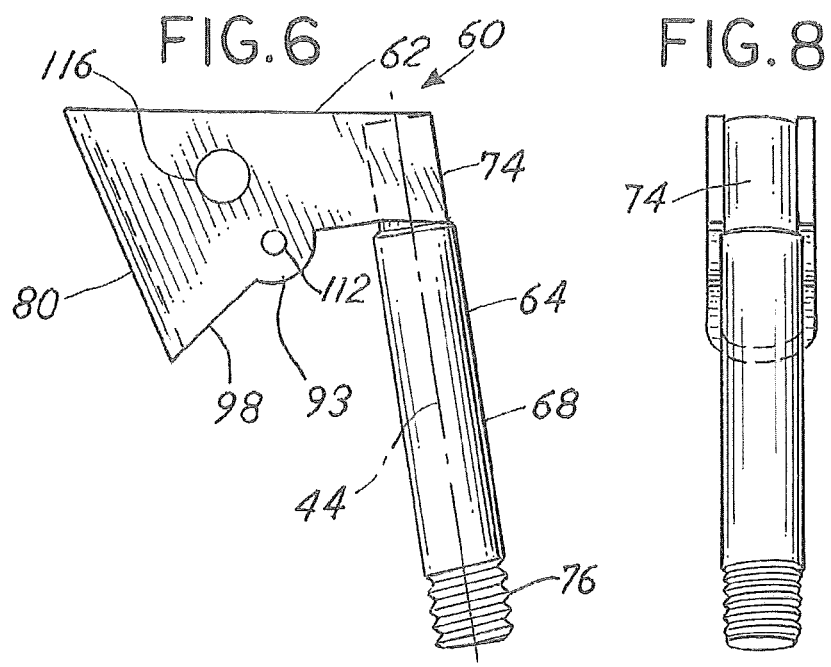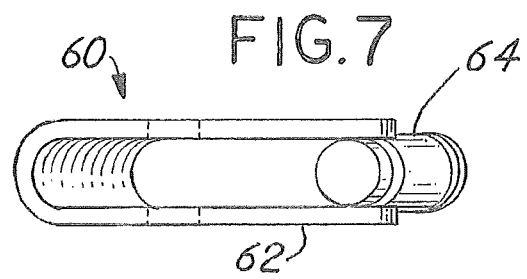

CLEVIS TYPE HOOK WITH SAFETY LATCH

CROSS REFERENCE TO RELATED APPLICATION

This is a utility application incorporating by reference and claiming priority to provisional application Ser. No. 61/963,125 filed Nov. 25, 2013 entitled "Clevis Type Slip Hook with Safety Latch".

BACKGROUND OF THE INVENTION

In a principal aspect the present invention relates to a clevis type slip hook with a safety latch to retain a cable, chain link, or similar element within the slot of the hook.

U.S. Pat. No. 7,967,353 entitled "Clevis Type Grab Hook with Safety Latch", discloses a grab hook which is designed to engage and hold the link of a chain in the slot of the hook. A clevis type slip hook has a more pronounced and larger slot than a grab hook for engaging and holding a chain, cable or the like. The invention disclosed in U.S. Pat. No. 7,967,353 may be incorporated in both types of clevis hooks: grab hooks and slip hooks. The present invention is focused upon a safety latch that is useful in a grab hook, but is especially useful when incorporated in a slip hook, i.e., a hook which includes a more pronounced or enlarged slot for engaging holding a chain, cable or the like. Nonetheless, the present invention, as did the prior invention of U.S. Pat. No. 7,967,353, may be utilized with and incorporated in either type of clevis hook as well as other similar devices.

As explained in U.S. Pat. No. 7,967,353, engagement of a chain link, cable, or the like with a throat opening of a grab hook or clevis type slip hook is a straightforward operation. However, retention of the item such as a chain link or cable in the slot of the hook may be thwarted in some instances. Thus, ensuring that the chain link, etc. remains within the slot or throat opening of a hook is a desirable feature associated with such hook devices.

SUMMARY OF THE INVENTION

Briefly, the present invention comprises a clevis type chain hook, grab hook or slip hook which includes a throat opening or slot between the tip end and shanked into which a chain link, cable or the like may be positioned. The hook further includes a latch or closure member rotatably attached by an axially moveable shaft to a clevis at the shank end of the hook. The closure member is fixed to the shaft and extends radially from the shaft. The closure or latch member comprises an end surface or face radially spaced from the axis of the pin or shaft and is sized so that it may be positioned in and generally fill the receiving slot of the hook between the tip end of the hook and the shank end. The latch or closure member comprises, in at least one embodiment, a pair of parallel plates which are welded to the outer or top end of the shaft and project radially from the shaft terminating with the outer end surface that fits within and generally fills the receiving slot of the hook between the tip end and the shank end of the hook. A biasing spring is fitted on the shaft intermediate a lower arm of the clevis and a retention member at the lower end of the shaft. The biasing member or spring element thus biases the shaft in a manner which positions the latch or closure member, when appropriately oriented, to close the receiving slot of the hook.

In order to open the receiving slot, the shaft is moved axially in opposition to the biasing force thereby raising the closure member out of a position fitted against the shank thus enabling the shaft to be rotated. The receiving slot of the hook is thereby opened. The closure member thus includes dimensional characteristics which enable it to fit against the shank and extend outwardly from the shank to fill the receiving slot of the hook at the tip end of the hook.

Further, the shank or upper arm of the clevis at the shank end and the closure member, in combination, may include a boss and detent couple which engage to preclude rotation of the closure member when the closure member is positioned to close the receiving slot of the hook. The boss may be formed or cast into the upper clevis arm region of the shank end of the hook and may include a through passage which may be aligned with a through passage in the closure member so that the engagement of the boss with a detent formed in the body member can be locked by inserting of some type of joinder device through the aligned through passages of the closure member and boss.

Additionally, the closure member may include a further opening or through passage for receipt of a latch cable that fits through the closure member and may be wrapped around the shank of the hook, again locking the closure member in position thereby closing the receiving slot of the hook. The body or closure member may be designed to be incorporated with hooks of various size as well as hooks having various slot dimensions.

Thus, it is an object and feature of the invention to provide a clevis type hook with a latching mechanism that may be closed to preclude access to, or opened to provide access to, the receiving slot of the hook and which is effective to preclude debris or other material from entering the slot thereby inadvertently engaging the hook.

Another object and feature of the invention is to provide a biased latch body or closure member which is maintained in position by means of a biasing element and which may be further retained in position by the interaction or coupling of a boss and detent of the shank and body member.

A further object and feature of the invention is to provide a simple, yet very reliable latching mechanism for closing the throat or opening of a clevis type hook.

These and other objects, advantages, features and aspects of the invention are set forth in a detailed description which follows.

BRIEF DESCRIPTION OF THE DRAWING

In the detailed description which follows, reference will be made to the drawing comprised of the following figures:

FIG. 1 is a plan view of a clevis type slip hook incorporating a safety latch;

FIG. 2 is a perspective view of the embodiment of FIG. 1 depicting the manner to effect release of the latch mechanism in order to open the receiving slot for the hook;

FIG. 3 is a cross sectional view of the body or closure member of the embodiment of FIG. 2;

FIG. 4 is a perspective view depicting the manner to effect release of the closure member in order to permit rotation of and disengagement of the closure member from closing the receiving slot of the hook;

FIG. 5 is a perspective view illustrating the closure member mounted to block a receiving slot and retained in that position by a cable or wire fitted through the closure member and around the shank or an arm of the clevis of the hook;

FIG. 6 is a side elevation of the closure member and shaft of the embodiment of FIGS. 1-5;

FIG. 7 is a top plan view of the closure member and shank of FIG. 6; and

FIG. 8 is a right hand side elevation view of the closure member and shank of FIG. 6.

DESCRIPTION OF AN EMBODIMENT OF THE INVENTION

FIGS. 1, 2, 4 and 5 illustrate in various views a typical clevis type, slip hook incorporating a safety latch in accord with the invention. FIG. 3 is a partial cross sectional view illustrating the manner in which the safety latch feature of the invention is designed to enable locking or coupling of the safety latch to a hook. FIGS. 6-8 illustrate in further detail the embodiment of the twist lock safety latch mechanism incorporated in the described embodiment of the invention.

Thus, referring to the figures, the embodiment depicted comprises a hook or hook body 22 which includes a tip end 24 and a shank end 26 that, in combination, define a receiving slot 28 having an opening 30 which extends between the tip end 24 and the shank end 26. The shank end 26 includes an upper clevis arm 36 and a spaced lower clevis arm 38. The upper arm 36 includes a through passage 40 which is aligned with a through passage 42 of the lower arm 38. The passages 40 and 42 are axially aligned on an elongate, straight axis 44. The arms 36 and 38 are spaced so that, by way of example, the link 51 of a chain 50 may be inserted in the opening 52 between the upper arm 36 and the lower arm 38. Of course, a cable or other type of cord, chain or the like may be placed in the slot or opening 52.

The hook 22 further includes a twist lock, latch mechanism 60. The twist lock, latch mechanism 60 is comprised of a latch, body or closure member 62 which is coupled with an elongate shaft member 64 that is fitted through the passages 40 and 42 in the upper arm 36 and lower arm 38, respectively. A spring member, spring biasing element, or some type of biasing element 66 is positioned around or in combination with the lower or bottom section 68 of the shaft 64 and is retained by a retention element such as a threaded nut fastener 70. Thus, the biasing member or element 66 will bias the twist latch, lock mechanism 60 by causing the elongate shaft 64 to move axially downward in FIGS. 1 and 2 thereby causing the body or closure member 62 to engage the upper arm 36 or shank end 26.

The configuration of the body member is illustrated in greater detail in FIGS. 6, 7 and 8. Thus, the body or closure member 62 is mounted to top end or section 74 of the shaft 64. The shaft 64 includes the bottom or lower section 68 which is threaded section 76 to enable receipt of retention element or nut 70. The shaft 64 comprises a rod or cylindrical member which enables movement in the compatible passages 40 and 42 in the arms 36 and 38, respectively. The passages 36 and 38 typically comprise cylindrical passages. Thus, the shaft 64 is typically cylindrical so that it may move axially as well as rotatably about the axis 44.

The body or closure member 62 includes an outer face or closure surface 80 which is radially spaced from the axis 44 and which has a length that is defined generally by the dimension of the receiving slot 30 and the spacing of arms 36 and 38. The angle of the surface 80 relative to the axis 44 may be chosen to accommodate the closure of the slot 30. For example, it may be parallel to the axis 44 or may form an acute or an obtuse angle depending upon the shape of hook 22 and spacing of tip end 24 and shank 26. Further, the body member 62 may be made in any or a series of configurations. The embodiment of the invention provides for first and second spaced side plates 90 and 92 which are joined by section 96 to provide a closure surface 80. The plates 90, 92 may thus be formed by bending a sheet and then attaching the opposed ends of the plate to the upper end 74 of the shaft 64.

A desired feature of the body or closure member 62, in addition to the closure surface 80, is compatibility of the lower edge of the body member 62; namely, the edge 98 that conforms with the outer surface of the shank end of upper arm 36. That is, the shank end 26 of the hook 22 may include a boss 100 with a lateral recess in one or both sides thereof; namely, a recess 102 and a through passage 104. The spaced plates 90 and 92 may thus be fitted over the boss 100. Further, the plates 90, 92 may include projecting flanges 91 and 93 which will fit into and are compatible with the respective recesses, such as recesses 102 and 103 located on opposite sides of boss 100.

Openings such as opening 110 in the plate 90 and a similar opening 112 in the plate 92 enable placement of a fastening wire through those openings 110, 112 to hold the body member 62 in place in the locked and latched position. Additionally, the plates 90 and 92 may include further openings 114 and 116 which provide another means for inclusion of a locking cable 120 being positioned therethrough and wrapped around the upper arm 36 to hold the body or closure member 62 in position by means of the cable 120.

Thus, typically the biasing element or biasing spring member 66 will retain the closure or body member 62 in a locked position. That locked position may be supplemented by a wire or cable 120 that cooperates with the body or closure member 62 to retain it in the locked engagement position described.

To release the locked body or closure member 62 from closing the slot 30, all of the ancillary locking features, such as the cable or cord 120, must be disconnected. The shaft 64 may then be biased manually against the force of the biasing spring element 66 as depicted in FIG. 4 to release the body member 62 from engagement with the upper arm 36 of the shank end 26. The body member 62 may then be rotated out of engagement to open the slot 28 as depicted in FIG. 2.

The clevis type slip hook as described may be used in combination with multiple types of chains, cables, bars, rods, locks and the like. The biased twist locking plate mechanism as described is particularly useful with respect to a slip hook design wherein the opening size of the receiving slot of the hook may vary. The design of the invention is thus enabled with various sizes and types of slip hooks having a wide variety of receiving slot openings. Thus, while there has been set forth an embodiment of the invention, it is to be understood that the invention, its aspects and features are not so limited, but do include equivalents and variations thereof.

What is claimed is:

1. In a clevis hook, including a hook body with a tip end, a shank end including a clevis having a first upper arm and a second, spaced lower arm, said arms each a through passage, said passage having a common through passage axis, said tip end and the upper arm of said shank end spaced to define an elongate, receiving slot with an open side, the improvement comprising:

a twist lock latch member mechanism for substantially closing the open side of the receiving slot, said latch member mechanism including an elongate shaft affixed to and projecting from said latch member, said shaft member having a top end and a bottom section, said bottom section axially slidably fitted through said clevis passages and rotatable about the axis;

said latch member further including:

a body closure member with an elongate closure surface sized for placement to substantially close the elongate receiving slot, said closure surface radially spaced from the slide axis and pivotally moveable about said axis between a position closing said receiving slot and a position opening said receiving slot, said body closure member configured along a lower edge to fit over a surface of said upper arm of said shank, said shank end and said lower edge comprising a detent and boss engagement couple; and a biasing element intermediate the lower arm and a spring retention element on the shaft to bias the shaft and closure member axially to maintain the closure surface in said slot closing position.

2. The clevis hook of claim 1 wherein the boss is positioned on the upper arm.

3. The clevis hook of claim 1 wherein the boss is positioned on a lower edge of the body member.

4. The clevis hook of claim 1 wherein said body member comprises substantially identical, spaced parallel side plates extending between and connecting the shaft and the closure surface.

5. The clevis hook of claim 4 further including axially aligned plate openings in the parallel plates.

6. The clevis hook of claim 4 wherein the boss is positioned on the upper arm and includes a boss through passage in alignment with the plate openings.

7. The clevis hook of claim 4 wherein the side plates and closure surface comprise a U cross section shaped single plate.

* * * * *